US010216792B2

(12) United States Patent
Brewster et al.

(10) Patent No.: US 10,216,792 B2
(45) Date of Patent: Feb. 26, 2019

(54) AUTOMATED JOIN DETECTION

(71) Applicant: Paxata, Inc., Redwood City, CA (US)

(72) Inventors: Dave Brewster, Redwood City, CA (US); Victor Tze-Yeuan Tso, Redwood City, CA (US); Ashley Jin, Los Gatos, CA (US); Quan Chuong Ta, South San Francisco, CA (US); Lakshman Roy Sankar, San Francisco, CA (US); Nenshad Dinshaw Bardoliwalla, Castro Valley, CA (US)

(73) Assignee: Paxata, Inc., Redwood City, CA (US)

( * ) Notice: Subject to any disclaimer, the term of this patent is extended or adjusted under 35 U.S.C. 154(b) by 253 days.

(21) Appl. No.: 14/883,500

(22) Filed: Oct. 14, 2015

(65) Prior Publication Data

US 2017/0109402 A1 Apr. 20, 2017

(51) Int. Cl.
*G06F 17/00* (2006.01)
*G06F 17/30* (2006.01)

(52) U.S. Cl.
CPC .. *G06F 17/30454* (2013.01); *G06F 17/30498* (2013.01)

(58) Field of Classification Search
CPC .................. G06F 17/30454; G06F 17/30498
See application file for complete search history.

(56) References Cited

U.S. PATENT DOCUMENTS

| 8,898,145 B2* | 11/2014 | Wang ................ G06F 17/30498 707/714 |
| 9,342,836 B2* | 5/2016 | Cronin .............. G06F 17/30539 |
| 2006/0074881 A1 | 4/2006 | Vembu |
| 2007/0130180 A1 | 6/2007 | Rasmussen |
| 2008/0154844 A1* | 6/2008 | Gao .................. G06F 17/30471 |
| 2010/0070500 A1 | 3/2010 | Cui |
| 2012/0323885 A1* | 12/2012 | Wang ................ G06F 17/30498 707/714 |
| 2014/0067791 A1* | 3/2014 | Idicula .............. G06F 17/30457 707/714 |
| 2016/0055205 A1* | 2/2016 | Jonathan ........... G06F 17/30454 707/714 |
| 2017/0031990 A1* | 2/2017 | Chakkappen ..... G06F 17/30466 |

OTHER PUBLICATIONS

Anton Dignos, Michael H. Bohlen, and Johann Gamper, "Overlap Interval Partition Join", SIGMOD'14, Jun. 22-27, 2014, ACM, pp. 1459-1470.*

* cited by examiner

*Primary Examiner* — Cheryl Lewis
(74) *Attorney, Agent, or Firm* — Van Pelt, Yi & James LLP (57) ABSTRACT

Automated join detection includes: identifying a set of one or more candidate joins of a first table and a second table; evaluating a set of one or more quality measures corresponding to the set of one or more candidate joins; obtaining a set of one or more selected joins among the set of one or more candidate joins, the set of one or more selected joins being selected based at least in part on one or more corresponding quality measures; and generating a joined table, including by joining the first table and the second table according to a selected join.

19 Claims, 10 Drawing Sheets

152

| Transaction ID | Buyer Name | Seller Name | Transaction Data |
|---|---|---|---|
| 12 | Alice A. | Charlie S. | ... |
| 17 | Bob H. | Dave R. | ... |
| 22 | Alice A. | Mary D. | ... |
| 14 | Fred H. | Larry M. | ... |
| ... | | | |

154

| Account ID | User Name | Zip |
|---|---|---|
| A123 | Alice A. | 54321 |
| A124 | Bob H. | 65432 |
| A125 | Charlie S. | 76543 |
| A126 | Dave R. | 98765 |
| ... | | |

156

| Transaction ID | Buyer Name | Seller Name | Transaction Data | Account ID | User Name | Zip |
|---|---|---|---|---|---|---|
| 12 | Alice A. | Charlie S. | ... | A123 | Alice A. | 54321 |
| 17 | Bob H. | Dave R. | ... | A124 | Bob H. | 65432 |
| 22 | Alice A. | Mary D. | ... | A123 | Alice A. | 54321 |
| 14 | Fred H. | Larry M. | ... | NA | NA | NA |
| ... | | | | ... | | |

AUTOMATED JOIN DETECTION

BACKGROUND OF THE INVENTION

Figure 1:
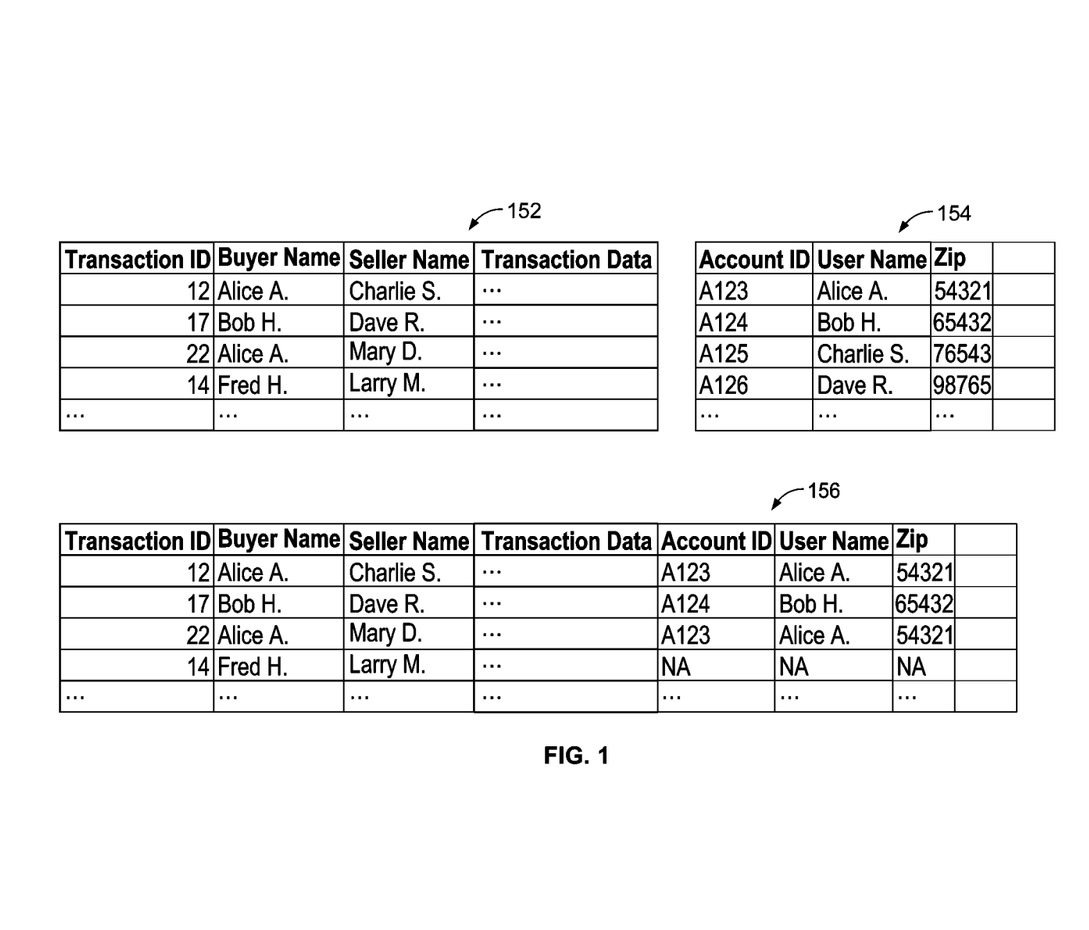
FIG. 1 is a diagram illustrating two example tables that are joined.

Automated data processing often involves the joining of tables. Specifically, fields from two or more tables are combined by using common values to create a combined table. FIG. 1 is a diagram illustrating two example tables that are joined. Table 152 is referred to as a driving table (or anchor table), which includes the following columns of data records: transaction identifier, buyer name, seller name, and transaction data. Table 154 is referred to as a lookup table, which includes the following columns of data records: account identifier, user name, and zip code. The buyer name column from table 152 and the user name column from table 154 can be used as the columns to be joined, and the joined result is table 156. This particular form of join is referred to as the left join, where the result table contains records in the anchor table (also referred to as the left table) regardless of whether there is a matching record in the lookup table (also referred to as the right table).

To perform a join in an existing language or program that supports the join operation, such as Structured Query Language (SQL) or Microsoft Excel®, the operator-user typically needs to specify the columns to be joined. Take the example shown in FIG. 1, to join the tables, the operator-user typically needs to specify that the buyer name column from table 152 and the user name column from table 154 are to be used as the columns to be joined. To effectively identify which columns should be joined can be difficult for the operator-user, especially when the amount of data involved is large. For example, there are often multiple join strategies available (e.g., using buyer name and user name as the join columns, using seller name and user name as the join columns, etc.), and sometimes the data that can be joined does not match exactly (e.g., the data in one table includes punctuation while the data in the other table does not). Further, the data tables being processed can originate from different sources (e.g., a transactions table from a web service operator and a products table from a vendor) and the data formats can be different (e.g., the transactions table lists phone numbers in a single column, while the products table lists area codes and local phone numbers in two separate columns). Thus, it can be difficult to detect and evaluate the possible joins.

Moreover, for large scale web applications, it is not uncommon for tables to have several billions of records; it is therefore nearly impossible to manually review the contents of the records to determine which columns have records that can be combined. Further, computer-based comparison of the records for determining whether the records match can be computationally intensive, which can lead to slow application response time.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated join detection is disclosed. In some embodiments, one or more candidate joins for two tables are identified. Quality measures corresponding to the candidate joins are evaluated based at least in part on overlap and selectivity. One or more selected joins are selected among the candidate joins. A joined table is generated by joining the two tables according to a selected join.

Figure 2:
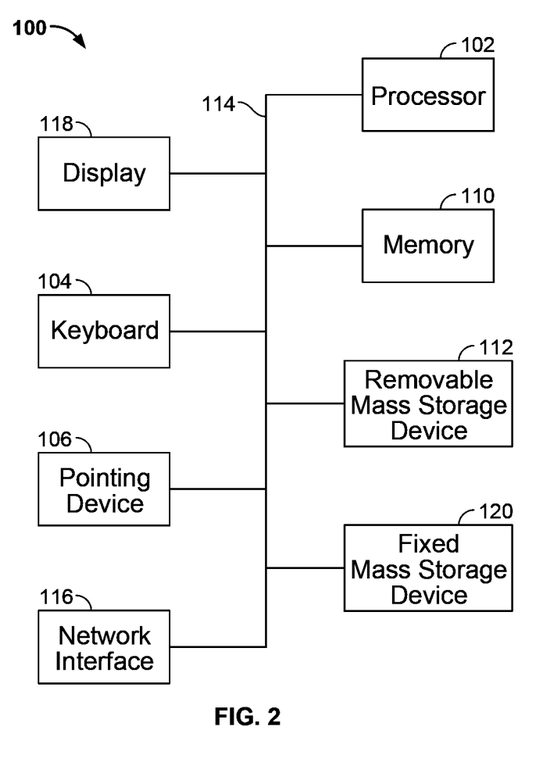
FIG. 2 is a functional diagram illustrating a programmed computer system for performing automated join detection in accordance with some embodiments.

FIG. 2 is a functional diagram illustrating a programmed computer system for performing automated join detection in accordance with some embodiments. As will be apparent, other computer system architectures and configurations can be used to perform automated join detection. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide data preparation engine 300 of FIG. 3 and/or executes/performs process 400, 600, 700, and/or 800.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 3:
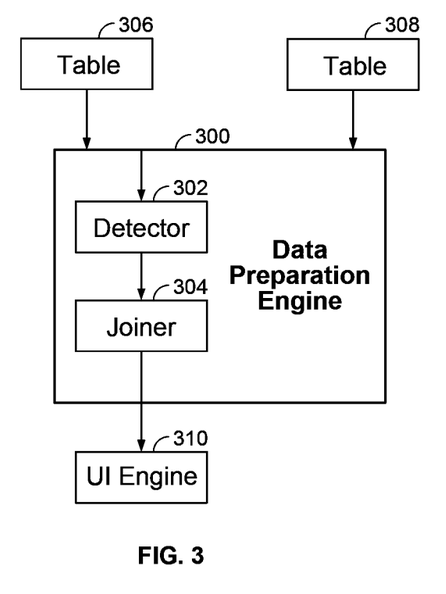
FIG. 3 is a system diagram illustrating an embodiment of a system for performing a join.

FIG. 3 is a system diagram illustrating an embodiment of a system for performing a join. In this example, a data preparation engine 300 is configured to access tables 306 and 308 which are to be joined. Data preparation engine 300 can be implemented on one or more servers in a network-based/cloud-based environment, a client device (e.g., a computer, a smartphone, a wearable device, or other appropriate device with communication capabilities), or a combination. Tables 306 and 308 include data records organized in rows and columns. A table can be stored in a memory (e.g., a random access memory), read or streamed from a storage (e.g., a local disk, a network storage, a distributed storage server, etc.), or obtained from any other appropriate sources.

The data preparation engine can be implemented using a system such as 100 of FIG. 2, and includes a detector 302 configured to detect candidate joins and a joiner 304 configured to perform the join. Detector 302 and joiner 304 can be implemented using a variety of techniques, including as software comprising computer-executable instructions operating on one or more processors included in one or more computing devices, as firmware comprising special instructions such as microcode operating on programmable logic devices, as hardware such as Application Specific Integrated Circuits (ASICs), or a combination thereof. The operations of the detector and the joiner are described in greater detail below.

A user interface engine 310 interacts with the data preparation engine to present table data, configuration options, join results, and any other appropriate information to the user in user interface screens and receive user input from user interface components. In various embodiments, user interface engine 310 can be implemented as a standalone application and/or a browser-based client application executing on a client device and communicating with the data preparation engine, as a part of the data preparation engine that sends display data to a client application, or a combination.

Figure 4:
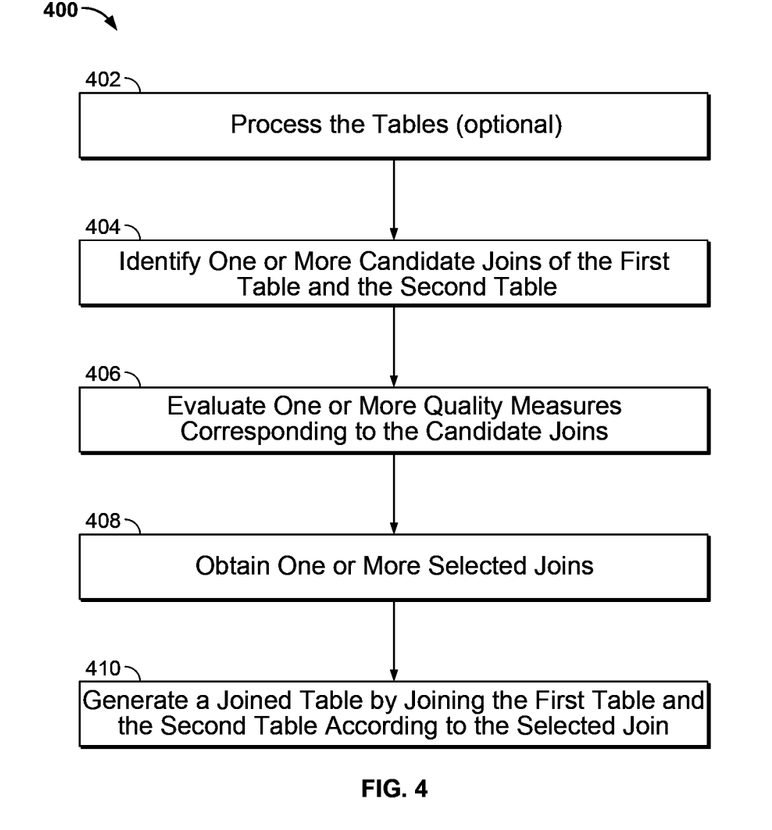
FIG. 4 is a flowchart illustrating an embodiment of a process for joining two or more tables.

FIG. 4 is a flowchart illustrating an embodiment of a process for joining two or more tables. Process 400 can be performed by a system such as 100.

At 402, preprocessing of the tables is optionally performed. The preprocessing allows table entries that are not identical to match (referred to as fuzzy match or inexact match), and in some cases reduces the amount of computation required for later comparisons. A variety of preprocessing techniques are used in various embodiments. For example, white spaces and/or punctuations can be removed, uppercase characters are converted to lower case characters (or vice versa), spelling check is performed, etc. In some embodiments, the specific preprocessing techniques being performed are configurable.

At 404, one or more candidate joins between the first table and the second table are identified. As used herein, a candidate join specifies the joining of a set of one or more columns in the first table and a set of one or more columns in the second table under certain join conditions. For example, a candidate join may specify that columns A and C of the first table are combined, and the combination is joined with column 2 of the second table under the join condition that the value of an entry in column A combined with an entry in column C matches the value of the entry in an arbitrary row from column 2. Details of how to determine the candidate joins are described below in connection with FIG. 6. As will be described in greater detail below, the candidate join detection can include identifying title matches, pattern matches, value matches, performing a join quality test, eliminating columns, and/or or other appropriate techniques.

At 406, one or more quality measures corresponding to the one or more candidate joins are evaluated.

In some embodiments, a quality measure for a candidate join includes an overlap score and a selectivity score. The scores can be computed based on sampled data (e.g., for a first table comprising 100,000 rows, taking a sample every 100 rows) or unsampled data (e.g., the entire first table). For purposes of discussion, unsampled data is used in the examples below; however, the techniques are also applicable to sampled data.

The overlap score is determined based at least in part on an amount of overlap (e.g., matching values) between the corresponding first set of one or more columns in the first table and the corresponding second set of one or more columns in the second table for the candidate join.

In some embodiments, one factor affecting the overlap score is the usage rate, in particular the usage rate of the first table and/or the usage rate of the second table for the candidate join. In some embodiments, the overlap score for a candidate join corresponds to the proportion of rows in one table that match rows in the other table according to the join conditions of the candidate join. A high quality join may involve a low usage rate in one table but a high usage rate in the other table, or high usage rates in both tables. For example, a driving table may include data from multiple regions (e.g., data for 50 states), and a lookup table may include data from a specific region (e.g., data for California only). Thus, when joining these tables, only a small proportion of the driving table rows will match with a large proportion of rows in the lookup table. Thus, if a high proportion of rows in one table matches rows in the other table, a high overlap score is assigned.

In some embodiments, another factor affecting the overlap score is the proportion of unique values in the matching records (also referred to as cardinality). For example, if the usage rate is low for a table but the matching rows represent a high cardinality/high proportion of unique values in the table (e.g., because one table contains a large number of sentinel values that do not match with values in the other table, such as blank values or "NA"), then the quality of the join is still high and a high overlap score is assigned.

In some embodiments, a mapping table of these factors to the overlap score or a function based on the factors is determined such that a high usage rate, or a low usage rate but high proportion of unique values, results in a high overlap score.

In some embodiments, a formula is used to compute the overlap score. An example formula used to compute the overlap score is:

$$\text{overlap\_score} = \max(\text{usage\_rate\_table1}, \text{usage\_rate\_table2})$$

The selectivity score indicates how specifically a join condition maps a row in the driving table to a single row in the lookup table. In some embodiments, the selectivity score is computed based on the number of rows selected from the lookup table for a randomly selected row in the driving table.

Tables 1 and 2 are used to illustrate the selectivity computation. Suppose a join is to be performed based on the "First Name" columns in the two tables, where Table 1 is the driving table and Table 2 is the lookup table. For the first row in the driving table ("Michael"), the number of matching rows selected from the lookup table is 2 (that is, two matching rows with the value of "Michael"). For the second row ("Michael") and the third row ("John") in the driving table, the numbers of matching rows selected from the lookup table based on the join condition are 2 and 1, respectively. Accordingly, the selectivity values for the first, second, and third rows of the driving table are specified to be 1:2, 1:2, and 1:1, respectively. In one implementation, the selectivity score is computed as $(1+1+1):(2+2+1)=3:5$. Other selectivity score computation techniques can be used. In some embodiments, the selectivity score is computed based on the average number of rows selected from the lookup table for a randomly selected unique join value. In some embodiments, outliers (e.g., the rows that have exceedingly high or exceedingly low selectivity values) are corrected. For example, individual unique values with outlier selectivity values are removed in the computation of the selectivity score.

TABLE 1

| First Name | Last Name |
|---|---|
| Michael | Jordan |
| Michael | Moore |
| John | Doe |

TABLE 2

| First Name | Last Name |
|---|---|
| Michael | Jordan |
| Michael | Moore |
| Jane | Doe |
| John | Doe |

In some embodiments, the quality score function includes a bivariate function f(x, y) on the overlap score (x) and the selectivity score (y). The specific bivariate function that is used is implementation dependent. $f(x, y)=ax+by$ and $f(x, y)=cx^2+dy^2$ (where a, b, c, d are constants) are some examples of the bivariate function.

At 408 of process 400, one or more selected joins are obtained among the set of candidate joins. In some embodiments, the quality measures of the candidate joins are compared. Based at least in part on the quality measures, one or more candidate joins that at least meet a certain quality measure threshold are retained, certain new candidate joins are discovered and added, and certain other candidate joins are removed. Specifically, in some embodiments, the overlap score and the selectivity score are compared to their respective thresholds. The thresholds can be set empirically. For example, the overlap score threshold is set to 0.4 and the selectivity score is set to 0.5. Other values can be used.

In some embodiments, the quality scores are ranked to determine the rankings of the join candidates. In some embodiments, the candidate joins are presented to a user via a user interface. The corresponding ranking information (e.g., quality measure scores) and other details associated with each candidate join are optionally displayed. The user is presented with options to select certain joins among the candidate joins to carry out the joins. In some embodiments, one or more default joins (e.g., the top N selected joins with the highest quality scores) are automatically selected.

At 410, a joined table is generated by joining the first table and the second table according to a selected join. As discussed above, in various embodiments, the selected join can be selected by the user or automatically selected by the data preparation engine according to the rankings of the candidate joins. One or more joined tables are generated based on one or more selected joins, and the results are displayed to the user in a user interface display, saved to a storage location (e.g., a file or the like), sent to another application, or a combination.

Figure 5:
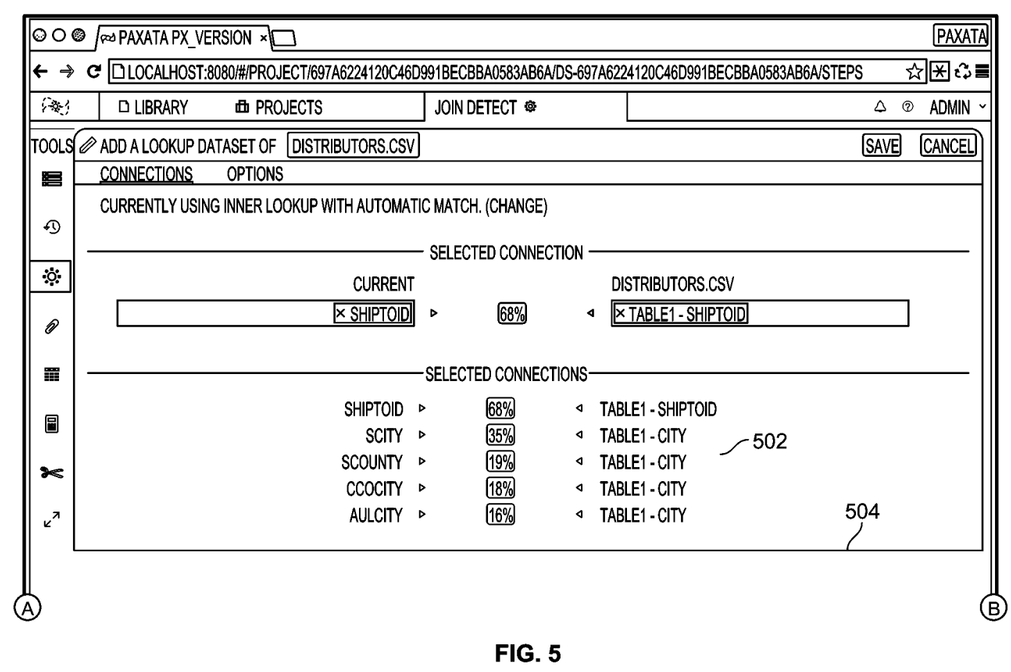
FIG. 5 is a user interface screen illustrating an example user interface for presenting the selected joins for the user and displaying results.

FIG. 5 is a user interface screen illustrating an example user interface for presenting the selected joins for the user and displaying results. In this example, the driving table includes the dataset named "current" and the lookup table includes the dataset of "distributors.csv." The candidate joins are presented in area 502. For each candidate join, the titles of the columns to be joined and overlap scores are displayed. The user may select a join among the candidate joins by clicking on a specific join. In this example, the "ShiptoID" column of the current table is joined with the "ShiptoID" of the distributors.csv table. The result of the selected join is shown in area 504.

In some embodiments, additional or alternative user interfaces are implemented to provide previews of what the joined table would look like based on various column pairings for different joins (e.g., one preview displaying a portion of the joined table as a result of joining the "ShiptoID" column of the current table with the "ShiptoID" of the distributors.csv table, another preview displaying a portion of the joined table as a result of joining the "ShiptoID" column of the current table with the "City" column of the distributors.csv table, etc.). The user may switch among the previews to select different joins and generate different joined tables.

Figure 6:
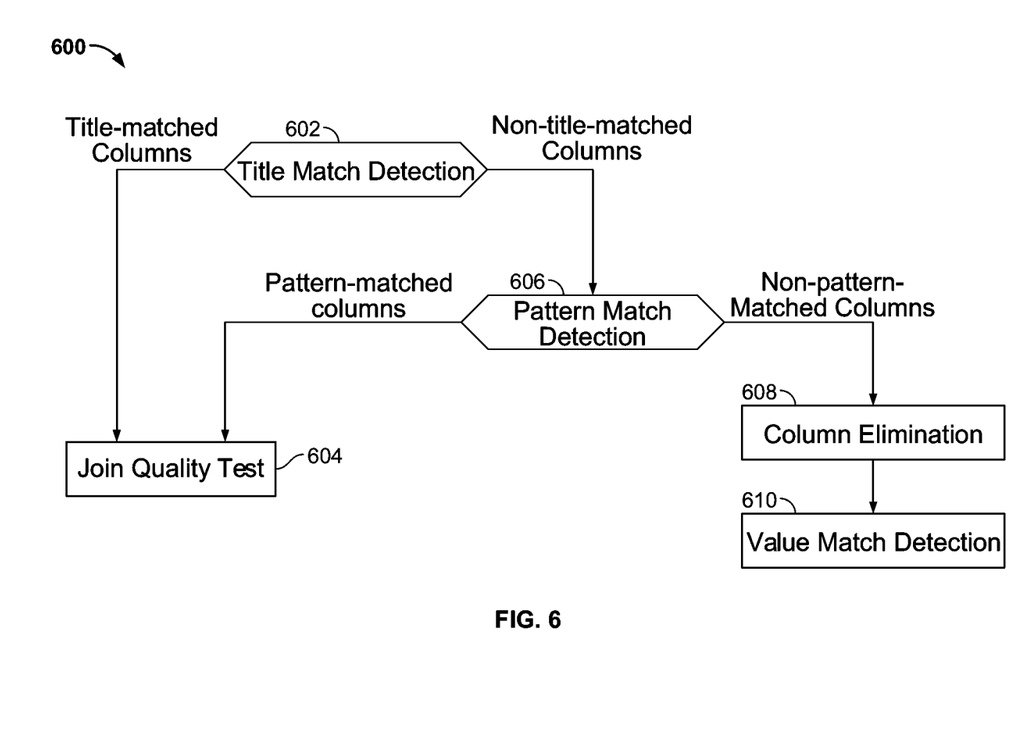
FIG. 6 is a flowchart illustrating an embodiment of a process for identifying candidate joins.

FIG. 6 is a flowchart illustrating an embodiment of a process for identifying candidate joins. Process 600 can be used to implement 404 and 406 of process 400. The result of process 600 is a set of candidate joins that may be presented to the user or used automatically by the system to generate joined tables.

In some embodiments, the records in the table are pre-processed to allow inexact (fuzzy) matches. For example, spaces and punctuations are removed, spelling is corrected, etc. Assuming that the tables are accessed and their columns are available for processing, at 602, a title match detection is performed on columns of the first table and columns of the second table to detect matching columns. In other words, the title of each column in the first table is compared with the title of each column in the second table to identify one or more sets of columns with matching titles. For example, if a column from the first table and a column from the second table both have the title of "account ID," then these columns are deemed to be matching columns. In some embodiments, inexact (fuzzy) matches are permitted. For example, the titles can be preprocessed to remove spaces and/or punctuations, change upper case letters into lower case letters (or vice versa), correct spelling errors, change words to synonyms, etc. to transform the titles into canonical forms for comparison. For instance, a column from the first table with the title of "account ID" and a column from the second table with the title of "ACCOUNT IDENTIFIER" are deemed to be matching columns.

For each set of title-matched columns (e.g., a column from the first table and a column from the second table deemed to have matching titles), a join quality test is performed at 604 to determine whether a join based on the set of matching columns should be kept as a candidate join, discarded, or combined with other joins and further tested. Details of the join quality test are described below in connection with FIG. 7.

For the remaining non-title-matched columns (e.g., columns not found to have matching titles with any other columns), a pattern match detection is performed at 606. The pattern match detection detects two or more columns exhibiting the same pattern of data. In some embodiments, the patterns being matched are checked against known patterns that are predefined. For example, records in two columns from two tables are 10-digit phone numbers (e.g., formatted as (###)-###-#### or ### ### ####) and are therefore found to match. In some embodiments, the patterns being matched are checked against inferred patterns (e.g., s0123, s0923, a0430 are found to have an inferred pattern of @'0'### (a letter followed by 0 followed by three other digits)). In some embodiments, values of records are analyzed to generate representative patterns using pattern detection tools such as a TOPEI algorithm-based pattern detection tool.

The pattern match detection further compares the data against the patterns, identifies the differences in columns that match or nearly match to compute matching scores, and ranks the matches based on their matching scores. More exact pattern matches will receive higher scores. For example, suppose it is detected that, in one table, column A has the pattern of ###@@@@ (three numerals followed by four letters), and in the other table, column 1 has the pattern of ###@@@A (three numerals followed by three letters followed by the letter A) and column 2 has the pattern of ###@@@# (three numerals followed by three letters followed by a numeral), then the patterns of columns A and 1 will lead to a higher pattern matching score than the patterns of columns A and 2. Further, the proportion of values in each column that match the detected pattern is also used in computing the pattern matching score. In some embodiments, existing pattern detection tools such as TOPEI are used to detect the potential matching patterns and compute pattern matching scores for the patterns. Columns with pattern matching scores exceeding a certain predefined pattern matching threshold are deemed to be pattern-matched. The remaining columns are deemed to be non-pattern-matched. The value of the pattern matching threshold is empirically determined in various embodiments.

For each set of pattern-matched columns (e.g., a column from a first table and a column from a second table that are deemed to have a pattern matching score exceeding a specific threshold), a join quality test is performed at 604.

For non-pattern-matched columns, a column elimination operation is performed at 608. In some embodiments, the user can manually set which columns are to be eliminated. In some embodiments, columns with certain properties are automatically identified and eliminated during the processing of the candidate joins. For example, high proportion or number of blank values or repeated values, a name or title of "description," "notes," or the like, a high proportion or number of punctuations, and a high proportion or number of words or values exceeding a certain length are some examples of column properties used to identify columns to be eliminated. This is because columns with these properties are empirically found not to be useful and therefore are eliminated.

In some embodiments, the properties are manually specified based on the experience of the user or administrator. In some embodiments, machine learning techniques are used to determine the column properties used in column elimination. How to train and apply the machine learning algorithm is known to those skilled in the art. Specifically, a training data set of properties (e.g., the proportion of blank or repeated values, the length of the values, the number of words, the number of alpha characters, the number of numeric characters, the ratio of alpha to numeric characters, etc.) is constructed using the tables in certain existing data preparation projects. The users' behavior in selecting the joins in the existing data preparation projects is observed to identify joins that are selected and/or not selected. A machine learning algorithm such as a support vector machine (SVM), a decision tree, etc. is used to train a learning machine that receives column properties as inputs and outputs decisions regarding which columns should be eliminated. In the case of an SVM, the training data set and the observation results (e.g., which joins are never selected by the user) are used to as input in the training phase for the SVM. When new tables undergo the column elimination operation, the column properties of the tables are identified and applied to the trained model, which identifies, based on the column properties, specific columns to be eliminated.

For those columns that are not eliminated, a value match detection is performed at 610 to detect those columns whose values match. Details of the value match detection are discussed below in connection with FIG. 8.

Figure 7:
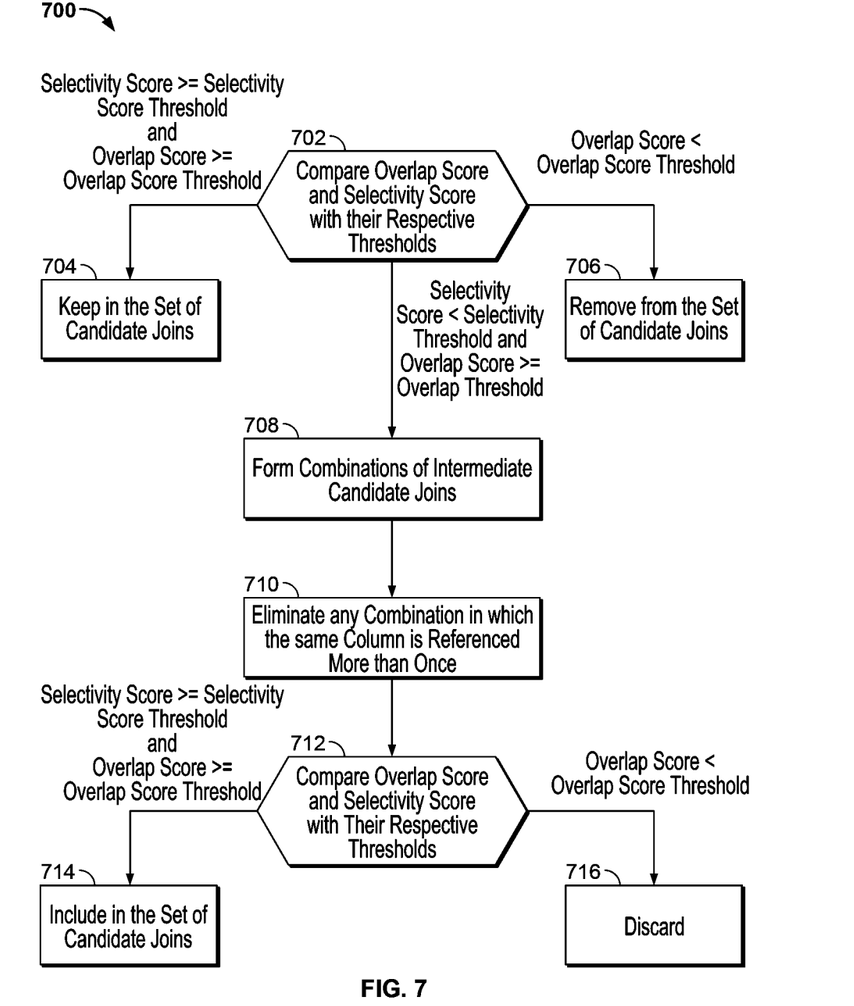
FIG. 7 is a flowchart illustrating an embodiment of a process for performing a join quality test.

FIG. 7 is a flowchart illustrating an embodiment of a process for performing a join quality test. Process 700 can be used to implement 604 of process 600.

As discussed above, in some embodiments, a quality measure for a join includes an overlap score and a selectivity score. In this example, at 702, the overlap score and the sensitivity score are compared with their respective thresholds. At 704, candidate joins with selectivity scores that at least meet a selectivity score threshold and overlap scores that at least meet an overlap score threshold are deemed to be high quality and kept in the set of candidate joins. At 706, candidate joins with overlap scores that do not meet the overlap score threshold are deemed to be low quality and removed from the set. However, there are also indeterminate candidates with intermediate quality measures, specifically with overlap scores meeting the overlap score threshold but selectivity scores not meeting the selectivity score threshold. In other words, these intermediate candidates provide matches with reasonably high usage rates, but the matches are not sufficiently specific.

These intermediate candidates, when combined with other intermediate candidates, produce additional candidate joins that may meet both thresholds. Thus, a correlated join search is performed on these additional candidate joins. The correlated join search combines columns to provide enriched data and come up with additional join candidates. For example, suppose the first table includes columns "first name" and "last name," and the second table includes columns "family name" and "given name." However, neither the "first name" to "given name" join nor the "last name" to "family name" join has a sufficiently high selectivity score. The combinatorial test combines the "first name" column and the "last name" column in the first table, and the "given name" column and the "family name" column in the second table, and generates a combined join of the two combinations. The combined results are subject to another join quality test. If the additional combined join's overlap score and selectivity score at least meet their respective thresholds, the additional combined join is kept as a candidate.

To perform the correlated join search, combinations of the intermediate candidates are formed at 708. For example, suppose that candidate joins 1, 2, . . . , K are intermediate candidates. Thus, $$\begin{bmatrix} 2 \\ K \end{bmatrix}$$

combinations of the indeterminate candidate joins are chosen, any combination in which the same column is referenced more than once is eliminated at 710, and the quality measures for the remaining combinations are evaluated at 712 by comparing the overlap score and selectivity score with their respective thresholds. At 714, those combinations whose selectivity scores at least meet the selectivity score threshold and overlap scores at least meet the overlap score threshold are deemed to be high quality and included in the set of candidate joins; at 716, the remaining combinations whose overlap scores do not meet the overlap score threshold are not included in the set. Note that in some embodiments, the remaining combinations can be further separated into new sets of intermediate candidates and low quality candidates, and 708-712 is repeated for the new sets of intermediate candidates (not shown in the diagram.)

Process 700 is illustrated using the example shown in List 1. Candidate joins J1 and J2 are deemed to be high quality since their selectivity scores at least meets the selectivity score threshold of 0.5 and their overlap scores at least meet the overlap score threshold of 0.4. Candidate join J6 has is deemed to be low quality since the overlap score is less than the overlap score threshold of 0.5. Candidate joins J3-J5 are deemed to be intermediate in quality because their selectivity scores do not meet the selectivity score threshold but their overlap scores meet the overlap score thresold.

$$\begin{bmatrix} 2 \\ 3 \end{bmatrix}$$

combinations of J3-J5 are used to form List 2. Specifically, candidate joins J3 and J4 are combined to form a new candidate join J7, candidate joins J3 and J5 are combined to form a new candidate join J8, and candidate joins J4 and J5 are combined to form a new candidate join J9. In J8, column B is referenced more than once; thus, J8 is eliminated. Of the remaining candidate joins, J9 is included in the set of candidate joins because it has sufficiently high selectivity score and overlap score, but J7 is not included due to its low overlap score.

List 1

| Candidate Join ID | Join Condition | Overlap Score | Selectivity Score |
|---|---|---|---|
| J1 | Join Column A, Table X with Column 1, Table Y | 0.6 | 0.8 |
| J2 | Join Column A, Table X with Column 2, Table Y | 0.7 | 0.5 |
| J3 | Join Column B, Table X with Column 3, Table Y | 0.5 | 0.4 |
| J4 | Join Column C, Table X with Column 4, Table Y | 0.6 | 0.3 |
| J5 | Join Columns A and B of Table X with Column 1 of Table Y | 0.7 | 0.2 |
| J6 | Join Columns A and B of Table X with Column 1 of Table Y | 0.2 | 0.8 |

List 2

| Candidate Join ID | Join Condition | Overlap Score | Selectivity Score |
|---|---|---|---|
| J7 | Join Column B, Table X with Column 3, Table Y and Join Column C, Table X with Column 4, Table Y | 0.2 | 0.5 |
| J8 | Join Column B, Table X with Column 3, Table Y and Join Columns A and B of Table X with Column 1 of Table Y | — | — |
| J9 | Join Column C, Table X with Column 4, Table Y and Join Columns A and B of Table X with Column 1 of Table Y | 0.6 | 0.7 |

Figure 8:
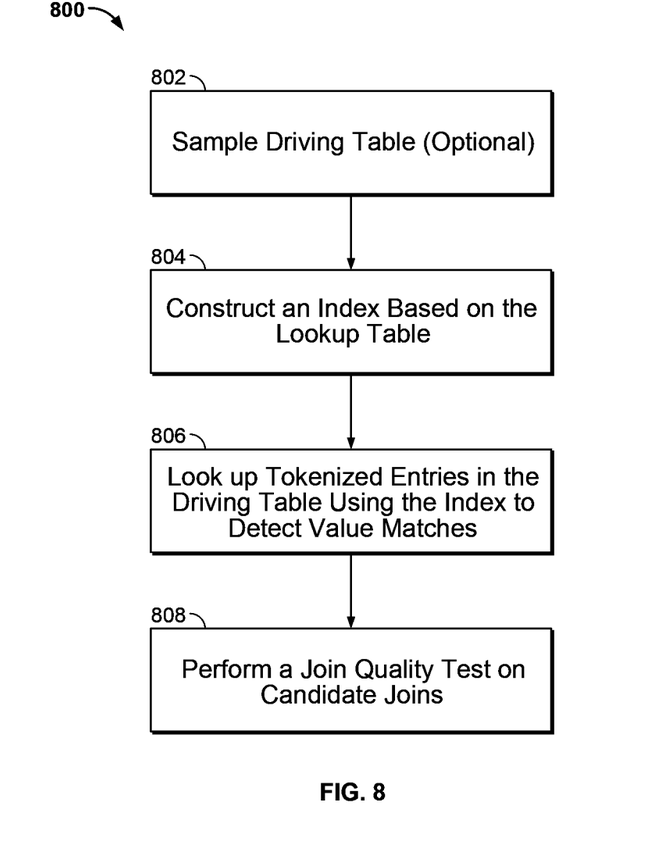
FIG. 8 is a flowchart illustrating an embodiment of a process for performing a value match detection.

FIG. 8 is a flowchart illustrating an embodiment of a process for performing a value match detection. Process 800 can be used to implement 610 of process 600.

At 802, the driving table is optionally sampled to reduce the search space and increase processing space. For example, one out of M (M being an integer) rows in the driving table can be selected to form a sampled driving table.

At 804, an index is constructed based on the lookup table. In particular, the values in the lookup table are represented using the index to facilitate search. As will be described in greater detail below in connection with FIG. 9, in some embodiments, the construction of the index includes tokenizing the entries in the lookup table, and forming "tries" that represent columns of tokenized entries.

At 806, tokenized entries in the driving table are looked up using the index to detect value matches. In some embodiments, the lookup is performed using the tries. A value may have multiple matches in the tries. Each value match corresponds to a mapping of lookup table column(s) to driving table column(s), which in turn corresponds to a way of joining certain columns in the lookup table and the driving table. A mapping can correspond to a one-to-one mapping of one lookup table column to one driving table column, a many-to-one mapping of multiple lookup table columns to one driving table column, or a one-to-many mapping of a lookup table column to multiple driving table columns. The value matches correspond to a set of candidate joins.

The set of candidate joins are subject to a join quality test at 808. The join quality test can be implemented using process 700. In some embodiments, the full set of candidate joins corresponding to the value matches is subject to the join quality test. In some embodiments, the set of candidate joins is filtered based on respective value match scores. Specifically, the match scores are compared with a match score threshold, and those candidate joins with value match scores that exceed the threshold value are included in the set of candidate joins and subject to the join quality test. In some embodiments, the match scores are ranked, and the N top ranking candidate joins are included in the set of candidate joins subject to the join quality test.

Figure 9:
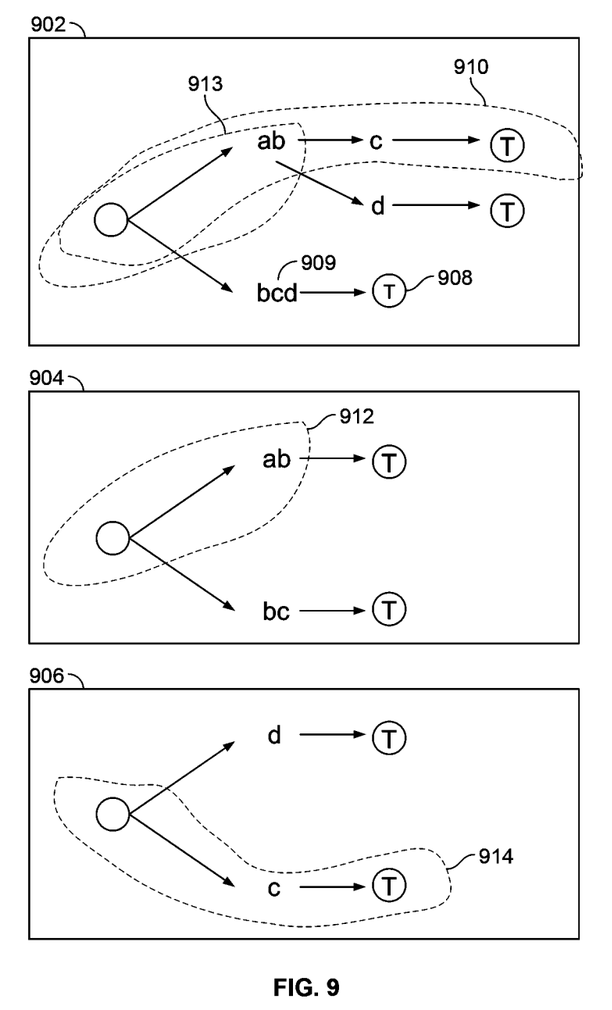
FIG. 9 is a diagram illustrating an example set of tries representing the example shown in Table 3.

Process 800 is explained in greater detail using example Tables 3 and 4 in connection with FIG. 9. Referring to 804 of process 800, in some embodiments, to construct the index, the values in the lookup table are tokenized according to a specified set of rules (e.g., ignoring white spaces, punctuation, case, cell order, order of the token within a cell, delimiting on white spaces, replacing words with synonyms, etc., or a combination there of). In some embodiments, the rules are presented in a configuration interface, and one or more configuration widgets (e.g., switches, checkboxes, etc.) are made available via a user interface screen to allow the user to select specific rules. The same rules are applied to the driving table to tokenize the driving table entries.

In this example, the index used to represent the tokens in the lookup table includes a plurality of tree structures (referred to as tries). A tokenized entry from the driving table is input into the tries to determine whether any value matches exist, and where the matches come from (e.g., which columns from the tables).

An example of a tokenized lookup table (Table 3) has three columns 1, 2, and 3, as follows:

TABLE 3

| 1 | 2 | 3 |
|---|---|---|
| abc | ab | c |
| abd | ab | d |
| bcd | bc | d |

FIG. 9 is a diagram illustrating an example set of tries representing the example shown in Table 3.

In this example, the tokens a, b, c, and d each correspond to a different word, such as "the," "quick," "brown," and "fox," respectively. Tries 902, 904, and 906 respectively represent columns 1, 2, and 3 of the lookup table (Table 3). A trie is implemented as a tree structure comprising one or more paths. A path has one or more nodes (such as 909) comprising one or more tokens, and a termination point (represented using a symbol such as 908). The use of a trie to facilitate search is highly efficient in terms of computation cycles and significantly reduces the amount of memory required for performing the search compared to traditional value-based search techniques. Techniques of constructing a trie for a column of tokenized entries and performing searches on one or more tries are known to those skilled in the art.

As shown, each trie is a prefix-based dictionary of the tokenized values in the corresponding column. It is possible to follow the paths in a trie to form all the tokenized entries in the corresponding column. For instance, trie 902 includes a path that traverses nodes (ab) and (c), then terminates; a path that traverses nodes (ab) and (d), then terminates; and a path that traverses node (bcd), then terminates.

Suppose that the tokenized driving table (Table 4) has three columns A, B, and C, as follows:

TABLE 4

| A | B | C |
|---|---|---|
| abc | ab | d |
| bcd | ab | c |
| abd | bc | d |

According to 806 of process 800, value matches of lookup table columns to driving table columns are detected using the tries. In some embodiments, the tokenized entry is entered into the tries to find one or more paths that return matching tokens.

For example, the entry at column A, row 1 of the driving table has a set of tokens (abc). To find matching values in the lookup table, trie 902 of FIG. 9 is searched first. An exact match for this set of tokens is found by following path 910 (that is, a path that has node (abc) followed by a termination point). This is a one-to-one mapping of lookup table column 1 to driving table column A. In other words, lookup table column 1 and driving table column A may be joined because there is a value match. A second match is found using tries 904 and 906 by combining paths 912 and 914 to locate tokens (ab) followed by token (c) and a termination point. This match represents a two-to-one mapping of lookup table columns 2 and 3 to driving table column A. In other words, the combination of lookup table columns 2 and 3 may be joined with driving table column A because there is a value match. In some embodiments, a value match score is computed for each path by counting the number of occurrences represented the path.

In another example, the tokenized entry at column B, row 1 of the driving table has tokens (ab). When the tries are searched with the token (ab), an exact match is found in path 912 of trie 904, thus representing a one-to-one mapping of lookup table column 2 to driving table column B. In other words, lookup table column 2 may be joined with driving table column B due to the value match. Another match is found in path 913 of trie 902, which includes the token value of (ab . . . ). This path does not terminate after tokens (ab), which means that more tokens are needed from the driving table to find a match on this path. One retry attempt is to add column C to column B to get a new entry with three tokens (abc). When this new entry is used for searching the tries, a matching result of (abc) followed by a termination point is found in path 910 of trie 902, representing a one-to-two mapping of lookup table column 1 to driving table columns B and C. In other words, lookup table column 1 may be joined with the combination of driving table columns B and C.

The tokenized entries in the driving table are looked up in the tries to identify matches. As shown in the examples above, each match corresponds to a mapping of lookup table column(s) to driving table column(s), which in turn corresponds to a candidate join of these columns. In some embodiments, all the candidate joins are subject to the join quality test. In some embodiments, the mappings are evaluated based on the value match scores (e.g., by summing the value match scores of all the results that correspond to this mapping) and the candidate joins are selected based on the value match scores. For example, the candidate joins corresponding to the top ranked mappings or at least meet certain total score threshold are selected as candidate joins to undergo the join quality test (e.g., process 700) to determine whether to be included in the set of candidate joins deemed to have sufficiently high quality.

Automated join detection has been disclosed. Although left join is discussed extensively for purposes of example, the technique is also applicable to other forms of join, such as right join, outer join, and inner join. The technique accurately identifies possible joins for large data sets. Further, the computation is efficient for large tables.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    identifying, using one or more processors, a set of one or more candidate joins of a first table and a second table, wherein a candidate join specifies a set of one or more conditions associated with joining a first set of one or more columns in the first table and a second set of one or more columns in the second table;
    evaluating, using the one or more processors, a set of one or more quality measures corresponding to the set of one or more candidate joins, a quality measure in the set of one or more quality measures being determined based at least in part on an overlap measure and a selectivity measure; wherein: the overlap measure measures an amount of overlap in matching values between values of records in the first set of one or more columns in the first table and values of records in the second set of one or more columns in the second table, and the selectivity measure measures how selectively a join condition maps a row in the first table to one or more rows in the second table and is determined based at least in part on, for one or more selected rows in the first table, one or more numbers of corresponding rows in the second table that match the one or more selected rows in the first table;
    obtaining, using the one or more processors, a set of one or more selected joins among the set of one or more candidate joins, the set of one or more selected joins being selected based at least in part on one or more corresponding quality measures; and
    generating, using the one or more processors, a joined table, including by joining the first table and the second table according to a selected join.

2. The method of claim 1, further comprising presenting the set of one or more candidate joins to a user.

3. The method of claim 2, wherein the one or more selected joins are selected by the user among the set of one or more candidate joins.

4. The method of claim 1, further comprising preprocessing the first table, the second table, or both.

5. The method of claim 1, wherein the identifying of the set of one or more candidate joins includes matching columns in the first table with columns in the second table.

6. The method of claim 5, wherein the matching of the columns in the first table with the columns in the second table includes matching titles.

7. The method of claim 5, wherein the matching of the columns in the first table with the columns in the second table includes matching patterns.

8. The method of claim 5, wherein the matching of the columns in the first table with the columns in the second table includes matching values.

9. The method of claim 8, wherein the matching of the values includes:
   establishing a plurality of tries representing values of columns in the second table; and
   for a row in the first table, searching for a matching path using the plurality of tries to identify a feasible join.

10. The method of claim 9, wherein the establishing the plurality of tries includes tokenizing values of corresponding columns in the second table.

11. The method of claim 5, wherein columns found to match are further subject to a join quality test.

12. The method of claim 11, wherein the join quality test includes:
   selecting one or more candidate joins having corresponding quality measures that at least meet a first threshold; and
   discarding one or more candidate joins having corresponding quality measures that do not at least meet a second threshold.

13. The method of claim 12, wherein the join quality test further includes:
   identifying candidate joins having intermediate quality measures; and
   performing a correlated join search based on a combination of at least two of the candidate joins having intermediate quality measures to identify one or more additional candidate joins that at least meet the first threshold.

14. The method of claim 11, wherein the join quality test includes eliminating one or more columns in the first table, eliminating one or more columns in the second table, or both.

15. The method of claim 14, wherein the columns to be eliminated are identified based on their properties using a machine learning technique.

16. The method of claim 1, wherein the overlap measure is determined based at least in part on a usage rate, a proportion of unique values in matching records, or both.

17. The method of claim 1, further comprising providing one or more joined table previews based on different column pairings.

18. A system, comprising:
   one or more processors configured to:
      identify a set of one or more candidate joins of a first table and a second table, wherein a candidate join specifies a set of one or more conditions associated with joining a first set of one or more columns in the first table and a second set of one or more columns in the second table;
      evaluate a set of one or more quality measures corresponding to the set of one or more candidate joins, a quality measure in the set of one or more quality measures being determined based at least in part on an overlap measure and a selectivity measure; wherein: the overlap measure measures an amount of overlap in matching values between values of records in the first set of one or more columns in the first table and values of records in the second set of one or more columns in the second table, and the selectivity measure measures how selectively a join condition maps a row in the first table to one or more rows in the second table and is determined based at least in part on, for one or more selected rows in the first table, one or more numbers of corresponding rows in the second table that match the one or more selected rows in the first table;
      obtain a set of one or more selected joins among the set of one or more candidate joins, the set of one or more selected joins being selected based at least in part on one or more corresponding quality measures; and
      generate a joined table, including by joining the first table and the second table according to a selected join; and
   one or more memories coupled to the one or more processors and configured to provide the one or more processors with instructions.

19. A computer program product embodied in a tangible non-transitory computer readable storage medium and comprising computer instructions for:
   identifying a set of one or more candidate joins of a first table and a second table, wherein a candidate join specifies a set of one or more conditions associated with joining a first set of one or more columns in the first table and a second set of one or more columns in the second table;
   evaluating a set of one or more quality measures corresponding to the set of one or more candidate joins, a quality measure in the set of one or more quality measures being determined based at least in part on an overlap measure and a selectivity measure; wherein: the overlap measure measures an amount of overlap in matching values between values of records in the first set of one or more columns in the first table and values of records in the second set of one or more columns in the second table, and the selectivity measure measures how selectively a join condition maps a row in the first table to one or more rows in the second table and is determined based at least in part on, for one or more selected rows in the first table, one or more numbers of corresponding rows in the second table that match the one or more selected rows in the first table;
   obtaining a set of one or more selected joins among the set of one or more candidate joins, the set of one or more selected joins being selected based at least in part on one or more corresponding quality measures; and
   generating a joined table, including by joining the first table and the second table according to a selected join; wherein
   the computer instructions are executed on one or more processors.

* * * * *